Jan. 23, 1962   W. D. REEVES   3,017,660
POULTRY HEAD REMOVER
Filed July 22, 1959

INVENTOR.
Willard D. Reeves
BY Victor J. Evans & Co.
ATTORNEYS

United States Patent Office 3,017,660
Patented Jan. 23, 1962

3,017,660
POULTRY HEAD REMOVER
Willard D. Reeves, P.O. Box 773, Center, Tex., assignor of one-third to C. S. Thomas and one-third to St. Elmo Cross, both of Center, Tex.
Filed July 22, 1959, Ser. No. 828,807
5 Claims. (Cl. 17—12)

This invention relates to poultry decapitators of the type wherein birds are suspended by the legs in wire loops hanging from a conveyor chain, and in particular a decapitator in which the neck of a bird is squeezed between tapering rollers and drawn through neck breaking blocks to a rotary cutting knife by which the head is severed from the end of the neck.

The purpose of this invention is to provide a decapitating machine in which the neck is first broken and the bone thereof drawn upwardly away from the head so that the cutting knife passes through the skin of the neck only and at the time that the head is removed the skin is in tension.

Various types of decapitating machines have been provided for chickens and other poultry. However, knives or cutting blades of such machines are required to cut the bone and it has been found desirable to first break and separate the bone so that the cutting knife passes through the skin of the neck only. With this thought in mind this invention contemplates a chicken head remover wherein the neck of the chicken is drawn by a conveyor from which the chicken is suspended between tapering rollers and breaking blocks so that the neck bones are separated before the neck reaches a cutting knife.

The object of this invention is, therefore, to provide a decapitating machine for fowl in which the bones of the neck are broken and separated before the neck reaches a cutting knife to facilitate removing the head from the neck.

Another object of the invention is to provide a poultry decapitator in which the skin of the neck is severed relatively close to the base of the head.

A further object of the invention is to provide a decapitator for chickens and other fowl in which the neck is broken and the bone separated before the neck is cut in which the machine is of a simple and economical construction.

With these and other objects and advantages in view the invention embodies a pair of parallel rolls having tapering surfaces, a stand by which the rolls are supported, a conveyor having leg receiving loops depending therefrom positioned above the rolls and in alignment therewith, flexible shafts for operating the rolls, a motor for rotating the flexible shafts, breaking blocks positioned to break the bone of a neck extended between the rolls, and a motor driven rotary knife for cutting the skin of a neck with the bones of the neck separated and with the skin held in tension.

Other features and advantages of the invention will appear from the following description taken in connection with the drawing, wherein.

Figure 1:
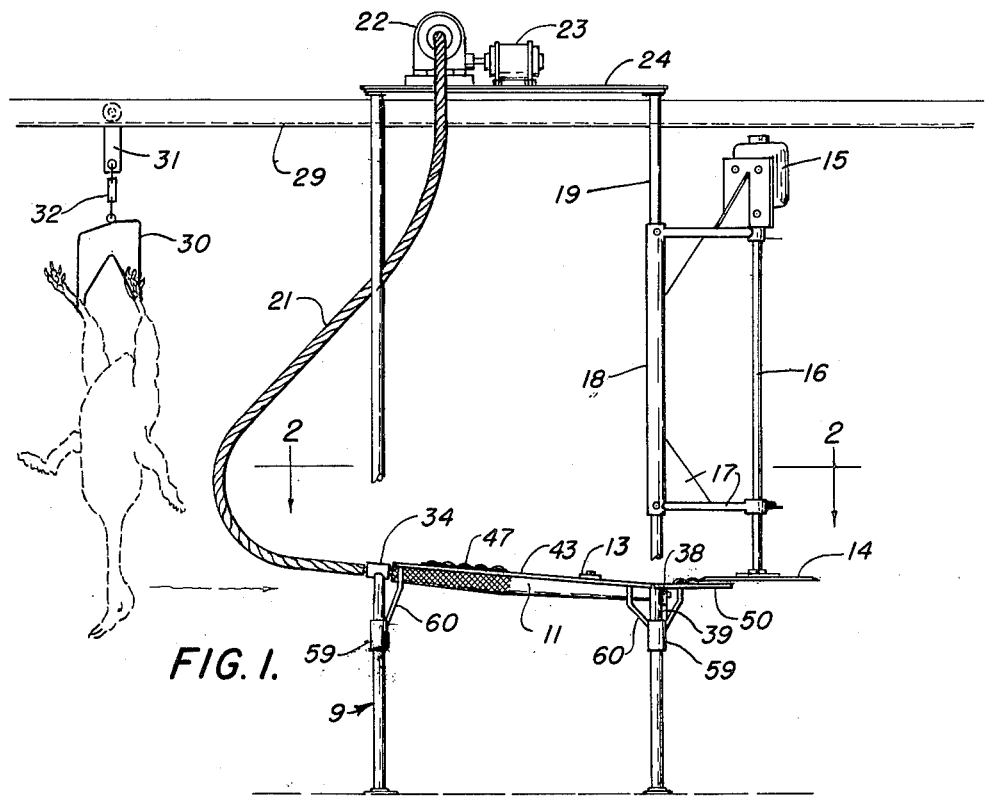
FIGURE 1 is a side-elevational view showing an assembly of the decapitating machine.

Referring now to the drawing wherein like reference characters denote corresponding parts the improved fowl decapitator of this invention includes a pair of tapering rolls 10 and 11, a pair of neck breaking blocks 12 and 13, a cutting knife or blade 14 rotated by a motor 15 through a shaft 16 and carried by a bracket including a plate 17 pivotally mounted by a hub 18 on a vertically disposed shaft 19, and flexible shafts 20 and 21 extended from the rollers 10 and 11 to a transmission 22, operated by a motor 23.

The motor 23 is positioned on a platform 24 supported by posts 25 and 26 at one side, and 27 and 28 at the opposite side; and the platform is positioned above a conveyor 29 from which loops 30 are suspended by hangers 31 and chains 32 connecting the loops to the hangers.

The rollers 10 and 11 are mounted on a supporting stand 9 and are positioned on the ends of the flexible shafts 20 and 21, and the shafts are rotatably mounted by bearings 33 and 34 carried by arms 35 and 36 extended inwardly from the posts 25 and 27, at one end of the stand 9, and by bearings 37 and 38 extended upwardly from a cross bar 39 at the other. The cross bar 39 is mounted on the posts 26 and 28 and the cross bar is also provided with supports 40 and 41 on which rails 42 and 43 are mounted; and the breaking blocks 12 and 13, which extend inwardly above the rolls 10 and 11, are secured to the rails by bolts 44 and 45.

Figure 2:
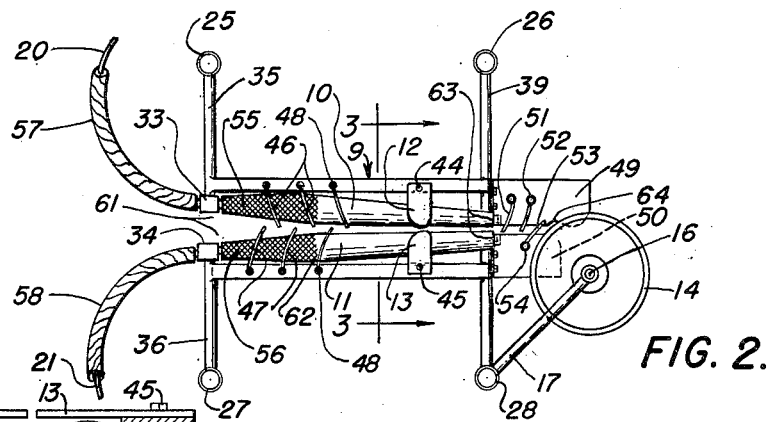
FIGURE 2 is a sectional plan through the machine taken on line 2—2 of FIGURE 1.
Figure 3:
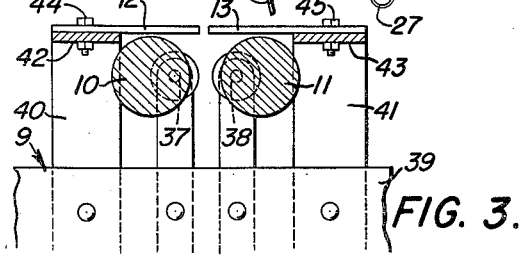
FIGURE 3 is a cross-sectional view on the line 3—3 of FIG. 2 and is taken through the tapered neck gripping rolls to show the breaking blocks in combination therewith and the parts are shown on an enlarged scale.

The rails 42 and 43 are provided with spring fingers 46 and 47 that are secured to the rails by bolts 48 and, as shown in FIGURE 2, the spring fingers retard the movement of the neck through the roll whereby the neck is held in tension and as tension is increased the neck is drawn between the breaking blocks 12 and 13 that break the bone at the base of the skull. With continued movement of the neck through the rolls the neck passes into the slot between the guards 49 and 50 which are provided with additional spring fingers 51 mounted by bolts 52. The guard 50 is provided with an oppositely positioned spring finger 53 that is secured to the guard by bolt 54.

The entrance ends of the rolls 10 and 11 are roughened, or knurled, as shown at the portions 55 and 56 to facilitate gripping the necks of fowl, and the flexible shafts 20 and 21 are covered by flexible sheaths 57 and 58.

The posts 25, 26, 27 and 28 are provided with sleeves 59 from which supporting brackets 60 extend for holding the rolls, bars, and other parts.

As illustrated in FIGURE 2, the tapering surfaces of the rolls increase from relatively small diameters at the entrance end 61 to comparatively large diameters at the peripheral terminus 62 and from the peripheral terminus 62 the rolls taper off to comparatively small ends 63. With the rolls formed in this manner the squeezing action is increased as the necks approach the peripheral terminus 62 and the gripping action continues throughout the remaining portions of the rolls.

With the parts assembled as illustrated and described chickens suspended by the loops 30 from a conveyor 29 move toward the decapitator with the necks entering a throat between the flexible shafts 20 and 21 and entrance ends of the rolls 10 and 11 and with surfaces of the rollers converging toward the peripheral terminus 62 the necks of the birds are squeezed and the squeezing action is increased as the necks pass through the rolls. As the necks pass through the blocks 12 and 13 the bones of the necks are broken with the neck bone leaving the head so that with continued movement the tension in a neck is increased, stretching the skin and drawing the bone from the head as the neck approaches the cutting knife 14 whereby the cutting knife passes through the skin close to the head and with the skin in tension. The guard 49 may be provided with a neck receiving recess 64 that is positioned to co-act with the blade 14 to facilitate cutting.

It will be understood that modifications, within the scope of the appended claims, may be made in the design and arrangement of the parts without departing from the spirit of the invention.

What is claimed is:

1. A decapitator for poultry comprising tapering rolls, means for feeding necks of poultry between the rolls, breaking blocks positioned in combination with the rolls, said breaking blocks being positioned to break bones of necks of poultry as the necks are drawn through the blocks, means positioned above and extending transversely of said rolls for increasing tension in the necks with the bones broken whereby the neck bone is drawn away from the head, arcuate spring fingers extended over the rolls for retarding passage of the necks of the poultry through the rolls, and a horizontally disposed knife positioned at the ends of said rolls for cutting the stretched skin of the neck at the base of the head.

2. A poultry head remover comprising juxta-positioned rolls, means for mounting the rolls with surfaces thereof in converging relation from entrance to exit ends thereof, breaking blocks positioned in combination with the rolls and spaced inwardly from exit ends thereof, means positioned above and extending transversely of said rolls for feeding poultry in an inverted position to the remover with the necks of the poultry passing between the rolls and breaking blocks, arcuate spring fingers extended over the rolls for retarding passage of the necks of the poultry through the rolls, and a cutting element positioned adjacently exit ends of the rolls for separating the heads of poultry from the necks.

3. A poultry decapitator comprising a stand, juxta-positioned tapering rolls rotatably mounted in the stand, means for rotating the rolls, the surfaces of the rolls being in converging relation from entrance to exit ends thereof, arcuate spring fingers extended over the rolls for retarding passage of the neck of a chicken through the rolls, breaking blocks mounted on the stand and extended over the rolls, said breaking blocks being spaced inwardly from exit ends of the rolls, spaced guards aligned with the rolls and extended from the frame, and a rotary cutting knife positioned to cut the heads from the necks of poultry drawn through the guards.

4. In a poultry decapitator, the combination which comprises a stand, spaced rolls having tapering outer surfaces, means for rotatably mounting the rolls in the stand with surfaces of the rolls in converging relation from entrance ends of the rolls to exit ends thereof, spaced bone breaking blocks spaced inwardly from exit ends of the rolls, means for rotating the rolls, spaced guards extended from exit ends of the rolls, spring fingers on the guards for retarding movement of the neck of a bird passing between the guards, spring fingers extended over the rolls for retarding the passage of necks of poultry through the rolls, and a cutting knife mounted in combination with the guards for cutting heads from the necks of poultry passing between the guards.

5. In a poultry decapitator, the combination which comprises a stand including four posts, rolls having tapering surfaces and having knurled entrance ends, means for rotatably mounting the rolls in the stand with surfaces of the rolls in converging relation from the entrance to the exit ends thereof, a motor mounted on the stand, flexible shafts operatively connected to the motor and extended from ends of the rolls for rotating the rolls, breaking blocks mounted above the rolls and spaced inwardly from exit ends thereof for breaking bones of necks of poultry drawn through the rolls, spaced guards extended from the frame and positioned in alignment with the rolls, spring fingers on the guards extended across the space between the guards for restricting movement of the necks of poultry through the space between the guards, a horizontally disposed rotary knife pivotally mounted on the frame and positioned to cut necks of poultry passing between the guards, and a motor mounted in combination with the knife for rotating the knife.

References Cited in the file of this patent

UNITED STATES PATENTS

| | | |
|---|---|---|
| 2,486,367 | Abrey et al. | Oct. 25, 1949 |
| 2,828,506 | O'Donnell | Apr. 1, 1958 |
| 2,846,718 | Sengelaub et al. | Aug. 12, 1958 |
| 2,924,846 | Zebarth | Feb. 16, 1960 |